(12) United States Patent
Sawano et al.

(10) Patent No.: US 6,411,318 B1
(45) Date of Patent: Jun. 25, 2002

(54) COLOR CONVERTING METHOD, DENSITY-GRADIENT CORRECTION METHOD AND COLOR PRINTER USING THE SAME

(75) Inventors: Mitsuru Sawano; Shu Shirai, both of Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/124,050

(22) Filed: Jul. 29, 1998

(30) Foreign Application Priority Data

Jul. 29, 1997 (JP) .............................. 9-203283

(51) Int. Cl.⁷ .............................. B41J 2/36; B41J 2/355
(52) U.S. Cl. ...................................... 347/188; 347/184
(58) Field of Search .................................. 347/183, 184, 347/188, 196, 172; 358/515, 518, 519, 520, 521, 523, 458, 300, 463, 535; 399/128; 382/167, 254

(56) References Cited

U.S. PATENT DOCUMENTS

| | | | | |
|---|---|---|---|---|
| 4,926,251 A | * | 5/1990 | Sekizawa et al. ........... | 358/535 |
| 5,255,085 A | * | 10/1993 | Spence ....................... | 358/527 |
| 5,410,335 A | * | 4/1995 | Sawano et al. .............. | 347/172 |
| 5,528,339 A | * | 6/1996 | Buhr et al. .................... | 355/32 |
| 5,574,544 A | * | 11/1996 | Yoshino et al. ................ | 399/60 |
| 5,680,230 A | * | 10/1997 | Kaburagi et al. ............ | 358/520 |
| 5,689,590 A | * | 11/1997 | Shirasawa et al. .......... | 382/254 |
| 5,740,502 A | * | 4/1998 | Kobayashi et al. ......... | 399/128 |
| 5,856,876 A | * | 1/1999 | Sasanuma et al. .......... | 358/300 |

* cited by examiner

*Primary Examiner*—Hai Pham
(74) *Attorney, Agent, or Firm*—Sughrue Mion, PLLC

(57) ABSTRACT

A method of color conversion includes preserving a 0% density for a particular color in the pre-conversion state to maintain a 0% density after conversion is provided via a translation table. Density gradation methods include a gradient value structure such that the highlight and shadow regions of the density are more finely represented in comparison to non-highlight and non-shadow regions. A further density correction method includes supplying an amount of energy to a non-image area when printing using a first color, wherein the amount of energy will not produce a dot in the non-image area upon application of a second color. A printer may employ one or more of the above methods in the form of a translation table or a density correction patch.

24 Claims, 16 Drawing Sheets

OUTPUT OF DENSITY CALIBRATION CHART DATA ⇨ [C, M, Y, K → FOUR-DIMENTIONAL TABLE STANDARD COLOR CONVERSION → C', M', Y', K']

THREE DIMENTIONAL LOOKUP TABLE

FIG. 6

DENSITY CALIBRATION CHART

| IDENTIFICATION NUMBER | HALF TONE DOT % | EXAMPLE |
|---|---|---|
| A (HIGHEST DENSITY) | 100 % | 255 |
| B (LOWEST DENSITY) | 0 % | 4 |
| 1 | 100 % | 249 |
| 2 | 99.9 % | 243 |
| 3 | 99.3 % | 239 |
| 4 | 98.7 % | 235 |
| 5 | 95.0 % | 220 |
| 6 | 90.0 % | 200 |
| 7 | 83.7 % | 180 |
| 8 | 77.0 % | 160 |
| 9 | 68.7 % | 140 |
| 10 | 58.0 % | 120 |
| 11 | 46.3 % | 100 |
| 12 | 33.2 % | 80 |
| 13 | 19.8 % | 62 |
| 14 | 10.2 % | 51 |
| 15 | 6.8 % | 47 |
| 16 | 3.3 % | 43 |
| 17 | 0.7 % | 40 |
| 18 | 0 % | 35 |
| 19 | 0 % | 30 |

FIG. 9

| GRADIENT DESIGN | | ORIGINAL IMAGE | | REPRODUCTION | CALIBRATION CHART |
|---|---|---|---|---|---|
| ENGINE GRADIENT VALUE | PERCENT | GRADIENT VALUE OF IMAGE DATA | PERCENT | DOT % | |
| 0 | .0 | | | | |
| 1 | .4 | | | | |
| 2 | .8 | | | | |
| 3 | 1.2 | | | | |
| 4 | 1.6 | 0 | 0.0 | 0.0 | ● |
| 5 | 2.0 | | | | |
| 6 | 2.4 | | | | |
| 7 | 2.7 | | | | |
| 8 | 3.1 | | | | |
| 9 | 3.5 | | | | |
| 10 | 3.9 | | | | |
| 11 | 4.3 | | | | |
| 12 | 4.7 | | | | |
| 13 | 5.1 | | | | |
| 14 | 5.5 | | | | |
| 15 | 5.9 | | | | |
| 16 | 6.3 | | | | |
| 17 | 6.7 | | | | |
| 18 | 7.1 | | | | |
| 19 | 7.5 | | | | |
| 20 | 7.8 | | | | |
| 21 | 8.2 | | | | |
| 22 | 8.6 | | | | |
| 23 | 9.0 | | | | |
| 24 | 9.4 | | | | |
| 25 | 9.8 | | | | |
| 26 | 10.2 | | | | |
| 27 | 10.6 | | | | |

FIG. 10

| GRADIENT DESIGN | | ORIGINAL IMAGE | | REPRODUCTION | CALIBRATION CHART |
| --- | --- | --- | --- | --- | --- |
| ENGINE GRADIENT VALUE | PERCENT | GRADIENT VALUE OF IMAGE DATA | PERCENT | DOT % | |
| 28 | 11.0 | | | | |
| 29 | 11.4 | | | | |
| 30 | 11.8 | | | | ● |
| 31 | 12.2 | | | | |
| 32 | 12.5 | | | | |
| 33 | 12.9 | | | | |
| 34 | 13.3 | | | | |
| 35 | 13.7 | | | | ● |
| 36 | 14.1 | | | | |
| 37 | 14.5 | | | | |
| 38 | 14.9 | | | | |
| 39 | 15.3 | | | | |
| 40 | 15.7 | 1 | 0.4 | 0.7 | ● |
| 41 | 16.1 | 2 | 0.9 | 1.6 | |
| 42 | 16.5 | 3 | 1.4 | 2.4 | |
| 43 | 16.9 | 5 | 1.9 | 3.3 | ● |
| 44 | 17.3 | 6 | 2.3 | 4.2 | |
| 45 | 17.6 | 7 | 2.8 | 5.0 | |
| 46 | 18.0 | 8 | 3.3 | 5.9 | |
| 47 | 18.4 | 10 | 3.8 | 6.8 | ● |
| 48 | 18.8 | 11 | 4.3 | 7.6 | |
| 49 | 19.2 | 12 | 4.8 | 8.5 | |
| 50 | 19.6 | 13 | 5.3 | 9.3 | |
| 51 | 20.0 | 15 | 5.8 | 10.2 | ● |
| 52 | 20.4 | 16 | 6.3 | 11.1 | |
| 53 | 20.8 | 17 | 6.7 | 11.9 | |
| 54 | 21.2 | 18 | 7.2 | 12.8 | |
| 55 | 21.6 | 20 | 7.7 | 13.7 | |
| 56 | 22.0 | 21 | 8.2 | 14.5 | |
| 57 | 22.4 | 22 | 8.7 | 15.4 | |

FIG. 11

| GRADIENT DESIGN | | ORIGINAL IMAGE | | REPRODUCTION | CALIBRATION CHART |
|---|---|---|---|---|---|
| ENGINE GRADIENT VALUE | PERCENT | GRADIENT VALUE OF IMAGE DATA | PERCENT | DOT % | |
| 58 | 22.7 | 23 | 9.2 | 16.3 | |
| 59 | 23.1 | 25 | 9.7 | 17.1 | |
| 60 | 23.5 | 26 | 10.2 | 18.0 | |
| 61 | 23.9 | 27 | 10.7 | 18.8 | |
| 62 | 24.3 | 28 | 11.1 | 19.6 | ● |
| 63 | 24.7 | 30 | 11.6 | 20.4 | |
| 64 | 25.1 | 31 | 12.1 | 21.2 | |
| 65 | 25.5 | 32 | 12.6 | 22.0 | |
| 66 | 25.9 | 33 | 13.1 | 22.8 | |
| 67 | 26.3 | 35 | 13.6 | 23.6 | |
| 68 | 26.7 | 36 | 14.1 | 24.4 | |
| 69 | 27.1 | 37 | 14.6 | 25.2 | |
| 70 | 27.5 | 38 | 15.1 | 26.0 | |
| 71 | 27.8 | 40 | 15.5 | 26.7 | |
| 72 | 28.2 | 41 | 16.0 | 27.4 | |
| 73 | 28.6 | 42 | 16.5 | 28.2 | |
| 74 | 29.0 | 43 | 17.0 | 28.9 | |
| 75 | 29.4 | 45 | 17.5 | 29.6 | |
| 76 | 29.8 | 46 | 18.0 | 30.3 | |
| 77 | 30.2 | 47 | 18.5 | 31.1 | |
| 78 | 30.6 | 48 | 19.0 | 31.8 | |
| 79 | 31.0 | 50 | 19.5 | 32.5 | |
| 80 | 31.4 | 51 | 19.9 | 33.2 | ● |
| 81 | 31.8 | 52 | 20.4 | 33.9 | |
| 82 | 32.2 | 53 | 20.9 | 34.7 | |
| 83 | 32.5 | 55 | 21.4 | 35.4 | |
| 84 | 32.9 | 56 | 21.9 | 36.1 | |
| 85 | 33.3 | 57 | 22.4 | 36.8 | |
| 86 | 33.7 | 58 | 22.9 | 37.6 | |
| 87 | 34.1 | 60 | 23.4 | 38.3 | |

FIG. 12

| GRADIENT DESIGN | | ORIGINAL IMAGE | | REPRODUCTION | |
|---|---|---|---|---|---|
| ENGINE GRADIENT VALUE | PERCENT | GRADIENT VALUE OF IMAGE DATA | PERCENT | DOT % | CALIBRATION CHART |
| 88 | 34.5 | 61 | 23.9 | 39.0 | |
| 89 | 34.9 | 62 | 24.3 | 39.6 | |
| 90 | 35.3 | 63 | 24.8 | 40.2 | |
| 91 | 35.7 | 65 | 25.3 | 40.8 | |
| 92 | 36.1 | 66 | 25.8 | 41.4 | |
| 93 | 36.5 | 67 | 26.3 | 42.0 | |
| 94 | 36.9 | 68 | 26.8 | 42.7 | |
| 95 | 37.3 | 70 | 27.3 | 43.3 | |
| 96 | 37.6 | 71 | 27.8 | 43.9 | |
| 97 | 38.0 | 72 | 28.3 | 44.5 | |
| 98 | 38.4 | 73 | 28.7 | 45.1 | |
| 99 | 38.8 | 75 | 29.2 | 45.7 | |
| 100 | 39.2 | 76 | 29.7 | 46.3 | ● |
| 101 | 39.6 | 77 | 30.2 | 46.9 | |
| 102 | 40.0 | 78 | 30.7 | 47.5 | |
| 103 | 40.4 | 80 | 31.2 | 48.1 | |
| 104 | 40.8 | 81 | 31.7 | 48.7 | |
| 105 | 41.2 | 82 | 32.2 | 49.3 | |
| 106 | 41.6 | 83 | 32.6 | 50.0 | |
| 107 | 42.0 | 85 | 33.1 | 50.6 | |
| 108 | 42.4 | 86 | 33.6 | 51.2 | |
| 109 | 42.7 | 87 | 34.1 | 51.8 | |
| 110 | 43.1 | 88 | 34.6 | 52.4 | |
| 111 | 43.5 | 89 | 35.1 | 53.0 | |
| 112 | 43.9 | 91 | 35.6 | 53.6 | |
| 113 | 44.3 | 92 | 36.1 | 54.1 | |
| 114 | 44.7 | 93 | 36.6 | 54.7 | |
| 115 | 45.1 | 94 | 37.0 | 55.2 | |
| 116 | 45.5 | 96 | 37.5 | 55.8 | |
| 117 | 45.9 | 97 | 38.0 | 56.4 | |

FIG. 13

| GRADIENT DESIGN | | ORIGINAL IMAGE | | REPRODUCTION | CALIBRATION CHART |
|---|---|---|---|---|---|
| ENGINE GRADIENT VALUE | PERCENT | GRADIENT VALUE OF IMAGE DATA | PERCENT | DOT % | |
| 118 | 46.3 | 98 | 38.5 | 56.9 | |
| 119 | 46.7 | 99 | 39.0 | 57.5 | |
| 120 | 47.1 | 101 | 39.5 | 58.0 | ● |
| 121 | 47.5 | 102 | 40.0 | 58.6 | |
| 122 | 47.8 | 103 | 40.5 | 59.2 | |
| 123 | 48.2 | 104 | 41.0 | 59.7 | |
| 124 | 48.6 | 106 | 41.4 | 60.3 | |
| 125 | 49.0 | 107 | 41.9 | 60.8 | |
| 126 | 49.4 | 108 | 42.4 | 61.4 | |
| 127 | 49.8 | 109 | 42.9 | 62.0 | |
| 128 | 50.2 | 111 | 43.4 | 62.5 | |
| 129 | 50.6 | 112 | 43.9 | 63.1 | |
| 130 | 51.0 | 113 | 44.4 | 63.6 | |
| 131 | 51.4 | 114 | 44.9 | 64.2 | |
| 132 | 51.8 | 116 | 45.4 | 64.8 | |
| 133 | 52.2 | 117 | 45.8 | 65.3 | |
| 134 | 52.5 | 118 | 46.3 | 65.9 | |
| 135 | 52.9 | 119 | 46.8 | 66.4 | |
| 136 | 53.3 | 121 | 47.3 | 67.0 | |
| 137 | 53.7 | 122 | 47.8 | 67.4 | |
| 138 | 54.1 | 123 | 48.3 | 67.8 | |
| 139 | 54.5 | 124 | 48.8 | 68.3 | |
| 140 | 54.9 | 126 | 49.3 | 68.7 | ● |
| 141 | 55.3 | 127 | 49.8 | 69.1 | |
| 142 | 55.7 | 128 | 50.2 | 69.5 | |
| 143 | 56.1 | 129 | 50.7 | 69.9 | |
| 144 | 56.5 | 131 | 51.2 | 70.3 | |
| 145 | 56.9 | 132 | 51.7 | 70.8 | |
| 146 | 57.3 | 133 | 52.2 | 71.2 | |
| 147 | 57.6 | 134 | 52.7 | 71.6 | |

FIG. 14

| GRADIENT DESIGN | | ORIGINAL IMAGE | | REPRODUCTION | CALIBRATION CHART |
| --- | --- | --- | --- | --- | --- |
| ENGINE GRADIENT VALUE | PERCENT | GRADIENT VALUE OF IMAGE DATA | PERCENT | DOT % | |
| 148 | 58.0 | 136 | 53.2 | 72.0 | |
| 149 | 58.4 | 137 | 53.7 | 72.4 | |
| 150 | 58.8 | 138 | 54.2 | 72.8 | |
| 151 | 59.2 | 139 | 54.6 | 73.3 | |
| 152 | 59.6 | 141 | 55.1 | 73.7 | |
| 153 | 60.0 | 142 | 55.6 | 74.1 | |
| 154 | 60.4 | 143 | 56.1 | 74.5 | |
| 155 | 60.8 | 144 | 56.6 | 74.9 | |
| 156 | 61.2 | 146 | 57.1 | 75.3 | |
| 157 | 61.6 | 147 | 57.6 | 75.8 | |
| 158 | 62.0 | 148 | 58.1 | 76.2 | |
| 159 | 62.4 | 149 | 58.6 | 76.6 | |
| 160 | 62.7 | 151 | 59.0 | 77.0 | ● |
| 161 | 63.1 | 152 | 59.5 | 77.3 | |
| 162 | 63.5 | 153 | 60.0 | 77.7 | |
| 163 | 63.9 | 154 | 60.5 | 78.0 | |
| 164 | 64.3 | 156 | 61.0 | 78.3 | |
| 165 | 64.7 | 157 | 61.5 | 78.7 | |
| 166 | 65.1 | 158 | 62.0 | 79.0 | |
| 167 | 65.5 | 159 | 62.5 | 79.3 | |
| 168 | 65.9 | 161 | 63.0 | 79.7 | |
| 169 | 66.3 | 162 | 63.4 | 80.0 | |
| 170 | 66.7 | 163 | 63.9 | 80.3 | |
| 171 | 67.1 | 164 | 64.4 | 80.7 | |
| 172 | 67.5 | 166 | 64.9 | 81.0 | |
| 173 | 67.8 | 167 | 65.4 | 81.3 | |
| 174 | 68.2 | 168 | 65.9 | 81.7 | |
| 175 | 68.6 | 169 | 66.4 | 82.0 | |
| 176 | 69.0 | 170 | 66.9 | 82.3 | |
| 177 | 69.4 | 172 | 67.4 | 82.7 | |

FIG. 15

| GRADIENT DESIGN | | ORIGINAL IMAGE | | REPRODUCTION | CALIBRATION CHART |
|---|---|---|---|---|---|
| ENGINE GRADIENT VALUE | PERCENT | GRADIENT VALUE OF IMAGE DATA | PERCENT | DOT % | |
| 178 | 69.8 | 173 | 67.8 | 83.0 | |
| 179 | 70.2 | 174 | 68.3 | 83.3 | |
| 180 | 70.6 | 175 | 68.8 | 83.7 | ● |
| 181 | 71.0 | 177 | 69.3 | 84.0 | |
| 182 | 71.4 | 178 | 69.8 | 84.3 | |
| 183 | 71.8 | 179 | 70.3 | 84.6 | |
| 184 | 72.2 | 180 | 70.8 | 85.0 | |
| 185 | 72.5 | 182 | 71.3 | 85.3 | |
| 186 | 72.9 | 183 | 71.7 | 85.6 | |
| 187 | 73.3 | 184 | 72.2 | 85.9 | |
| 188 | 73.7 | 185 | 72.7 | 86.2 | |
| 189 | 74.1 | 187 | 73.2 | 86.5 | |
| 190 | 74.5 | 188 | 73.7 | 86.9 | |
| 191 | 74.9 | 189 | 74.2 | 87.2 | |
| 192 | 75.3 | 190 | 74.7 | 87.5 | |
| 193 | 75.7 | 192 | 75.2 | 87.8 | |
| 194 | 76.1 | 193 | 75.7 | 88.1 | |
| 195 | 76.5 | 194 | 76.1 | 88.5 | |
| 196 | 76.9 | 195 | 76.6 | 88.8 | |
| 197 | 77.3 | 197 | 77.1 | 89.1 | |
| 198 | 77.6 | 198 | 77.6 | 89.4 | |
| 199 | 78.0 | 199 | 78.1 | 89.7 | |
| 200 | 78.4 | 200 | 78.6 | 90.0 | ● |
| 201 | 78.8 | 202 | 79.1 | 90.4 | |
| 202 | 79.2 | 203 | 79.6 | 90.7 | |
| 203 | 79.6 | 204 | 80.1 | 91.0 | |
| 204 | 80.0 | 205 | 80.5 | 91.2 | |
| 205 | 80.4 | 207 | 81.0 | 91.5 | |
| 206 | 80.8 | 208 | 81.5 | 91.7 | |
| 207 | 81.2 | 209 | 82.0 | 92.0 | |

FIG. 16

| GRADIENT DESIGN | | ORIGINAL IMAGE | | REPRODUCTION | CALIBRATION CHART |
|---|---|---|---|---|---|
| ENGINE GRADIENT VALUE | PERCENT | GRADIENT VALUE OF IMAGE DATA | PERCENT | DOT % | |
| 208 | 81.6 | 210 | 82.5 | 92.2 | |
| 209 | 82.0 | 212 | 83.0 | 92.4 | |
| 210 | 82.4 | 213 | 83.5 | 92.7 | |
| 211 | 82.7 | 214 | 84.0 | 92.9 | |
| 212 | 83.1 | 215 | 84.5 | 93.1 | |
| 213 | 83.5 | 217 | 84.9 | 93.4 | |
| 214 | 83.9 | 218 | 85.4 | 93.6 | |
| 215 | 84.3 | 219 | 85.9 | 93.9 | |
| 216 | 84.7 | 220 | 86.4 | 94.1 | |
| 217 | 85.1 | 222 | 86.9 | 94.3 | |
| 218 | 85.5 | 223 | 87.4 | 94.6 | |
| 219 | 85.9 | 224 | 87.9 | 94.8 | |
| 220 | 86.3 | 225 | 88.4 | 95.0 | ● |
| 221 | 86.7 | 227 | 88.9 | 95.3 | |
| 222 | 87.1 | 228 | 89.3 | 95.5 | |
| 223 | 87.5 | 229 | 89.8 | 95.8 | |
| 224 | 78.8 | 230 | 90.3 | 96.0 | |
| 225 | 88.2 | 232 | 90.8 | 96.3 | |
| 226 | 88.6 | 233 | 91.3 | 96.5 | |
| 227 | 89.0 | 234 | 91.8 | 96.8 | |
| 228 | 89.4 | 235 | 92.3 | 97.0 | |
| 229 | 89.8 | 237 | 92.8 | 97.3 | |
| 230 | 90.2 | 238 | 93.3 | 97.5 | |
| 231 | 90.6 | 239 | 93.7 | 97.8 | |
| 232 | 91.0 | 240 | 94.2 | 98.0 | |
| 233 | 91.4 | 242 | 94.7 | 98.3 | |
| 234 | 91.8 | 243 | 95.2 | 98.5 | |
| 235 | 92.2 | 244 | 95.7 | 98.7 | ● |
| 236 | 92.5 | 245 | 96.2 | 98.8 | |
| 237 | 92.9 | 247 | 96.7 | 99.0 | |

FIG. 17

| GRADIENT DESIGN | | ORIGINAL IMAGE | | REPRODUCTION | CALIBRATION CHART |
| --- | --- | --- | --- | --- | --- |
| ENGINE GRADIENT VALUE | PERCENT | GRADIENT VALUE OF IMAGE DATA | PERCENT | DOT % | |
| 238 | 93.3 | 248 | 97.2 | 99.2 | |
| 239 | 93.7 | 249 | 97.7 | 99.3 | ● |
| 240 | 94.1 | 250 | 96.1 | 99.5 | |
| 241 | 94.5 | 252 | 96.6 | 99.6 | |
| 242 | 94.9 | 253 | 99.1 | 99.8 | |
| 243 | 95.3 | 254 | 99.6 | 99.9 | ● |
| 244 | 95.7 | 255 | | | |
| 245 | 96.1 | 255 | | | |
| 246 | 96.5 | 255 | | | |
| 247 | 96.9 | 255 | | | |
| 248 | 97.3 | 255 | | | |
| 249 | 97.6 | 255 | 100.0 | 100.0 | ● |
| 250 | 98.0 | 255 | | | |
| 251 | 98.4 | 255 | | | |
| 252 | 98.8 | 255 | | | |
| 253 | 99.2 | 255 | | | |
| 254 | 99.6 | 255 | | | |
| 255 | 100.0 | 255 | 100.0 | 100.0 | |

Y, M, C (rows 244–254 bracket); K (row 255)

COLOR CONVERTING METHOD, DENSITY-GRADIENT CORRECTION METHOD AND COLOR PRINTER USING THE SAME

BACKGROUND OF INVENTION

The present invention relates to a color conversion method and a density gradient correction method for a printer for mainly producing a color proof for forming a color image and a printer capable of performing the methods When a color proof is produced by using a color conversion (hereinafter called "color matching") technology for matching a color print to printed matter, a color matching method similar to a conventional method is employed. That is, yellow (Y), magenta (M), cyan (C) and black (K) data items are first converted into data of chromaticity, and then converted into C, M, Y and K data peculiar to the printing system by using a translation table. The above-mentioned method is a known and marketed color matching method as "Color Sync" (trade name).

A density calibration technology for correcting the sensitivity difference of a material and a machine is disclosed in Japanese Patent Application No. Hei. 9-126108 applied by the applicant of the present invention. The density calibration technology has the structure that the intervals of the instructed halftone % are made to be constant.

The two conventional methods have the following problems. When a color proof is produced by using the conventional color matching technology, color matching of pure colors, such as red (R), blue (B), green (G), Y, M and C, sometimes causes a highlight of another color to slightly be mixed with the pure color even if the hue of the coloring material is slightly shifted from a required hue. When a user performs an operation for confirming the produced color proof by using a magnifier in order to confirm the correctness of image data, halftone-dot gradient (the following fact cannot easily visually be confirmed in a case of density gradient) encounters the following problem: although, for example, red (R) is composed of only magenta (M) and yellow (Y), cyan (C) is sometimes mixed if the hue of the coloring material is slightly shifted from a required hue after the conventional color matching operation has been performed. In this case, there arises a problem in that a user incorrectly determines that original data has an error if mixture of cyan (C) is detected when the user confirms that data is composed of only magenta (M) and yellow (Y) by using a magnifier. Although original data is free from an error, color matching sometime causes another color to sometimes be mixed with the pure color.

The second conventional technology using the density calibration has the following problem.

(1) In a case of the halftone dot gradient, whether the gradient is solid (that is, a shadow having a gradient of 100%) or 99% can easily be determined by using a magnifier. That is, white missing in a solid image can easily be detected. When a user looks the image to confirm that the image is a solid image by using a magnifier, the user detects some white missing portions. In this case, there arises a problem in that the user misunderstands that original data has an error and thus checking cannot be performed.

(2) If original data is black data, solid characters are frequently used and thicknesses must strictly be correct. If an end of a character becomes faint, it appears that a thin character has been formed. To prevent this, a gradient of 99% is insufficient. In this case, the gradient must reliably be made to be 100%.

(3) The above-mentioned problems must always be solved even if the sensitivity of the material and the machine is changed. Therefore, density calibration for compensating the difference in the sensitivity of the material and the machine must be performed.

In a case of the halftone dot gradient, (1) whether or not a dot is included in the highlight and (2) whether or not the solid image is deformed are of extreme importance. Even if intermediate gradients are somewhat shifted, larger shift is permitted as compared with the highlight and shadow. Therefore, the accuracy for density-calibrating the highlight and the shadow must be improved.

(4) The sensitivity of a recording material for a second color is sometimes higher than that for a primary color. In this case, there arises a problem in that the margin for continuously reproducing the gradient in the secondary or higher color becomes insufficient for the highlight portions when the density calibration of the primary color is performed.

Since the sensitivity performance is different because of the difference in the material and the machine, shadow cannot sometimes be formed if the material and the machine have low sensitivity. When the material and machine have high sensitivity, highlight cannot sometimes be formed.

(5) Hitherto, weak energy has been supplied to a head to heat a non-image portion so as to prevent mixture of a dot with the highlight from taking place. In this case, a dot is undesirably added to even a non-image portion if the color is secondary or higher color and a highlight image is formed.

SUMMARY OF INVENTION

The present invention attempts to solve the above-mentioned problems and an object of the present invention is to provide a density gradient correction method with which a user does not misunderstand that original data has an error and which is capable of forming highlight to shadow regardless of the difference in the material and the machine and whether or not the color is a secondary or higher color.

To achieve objects, according to first aspect of the present invention, three or more dimensional color conversion is performed such that when at least one color of coloring materials, that is, a specific color such as C, M, Y, K, R, G, B or gold, is 0%, the at least one color is 0%.

According to a second aspect of the invention, the difference in energy is enlarged for only a solid gradient of a shadow portion as compared with that for a usual gradient.

According to a third aspect of the invention, the density gradient correction method of the second aspect is arranged in such a manner that the difference of only K is enlarged as compared with the differences of C, M and Y.

According to a fourth aspect of the invention, a method comprises the step of performing density calibration by using a density calibrating patch having a structure that calibrations in the vicinity of a highlight portion and a shadow portion are fine.

According to a fifth aspect of the invention, there is provided with a density-calibrating patch having a structure that calibrations in the vicinity of a highlight portion and a shadow portion are fine.

According to a sixth aspect of the invention, a method comprises the step of: providing a margin width for a highlight portion and a shadow portion. In this case, the margin width for the highlight portion is wider than that for the shadow portion.

According to a seventh aspect of the invention, a method comprises the step of also supplying weak energy to a head corresponding to a non-image portion in a case of a primary color such that the intensity of the weak energy does not cause a dot to be printed in the non-image portion in a case of-a secondary or higher color.

BRIEF DESCRIPTION OF THE DRAWINGS

FIG. 6 shows a density calibration chart;

FIG. 9 shows a first page of a density calibration table for realizing the correction method according to the present invention;

FIG. 10 shows a second page of the density calibration table for realizing the correction method according to the present invention;

FIG. 11 shows a third page of the density calibration table for realizing the correction method according to the present invention;

FIG. 12 shows a fourth page of the density calibration table for realizing the correction method according to the present invention;

FIG. 13 shows a fifth page of the density calibration table for realizing the correction method according to the present invention;

FIG. 14 shows a sixth page of the density calibration table for realizing the correction method according to the present invention;

FIG. 15 shows a seventh page of the density calibration table for realizing the correction method according to the present invention;

FIG. 16 shows an eighth page of the density calibration table for realizing the correction method according to the present invention; and FIG. 17 shows a ninth page of the density calibration table for realizing the correction method according to the present invention.

DETAILED DESCRIPTION OF PREFERRED EMBODIMENTS

Figure 4:
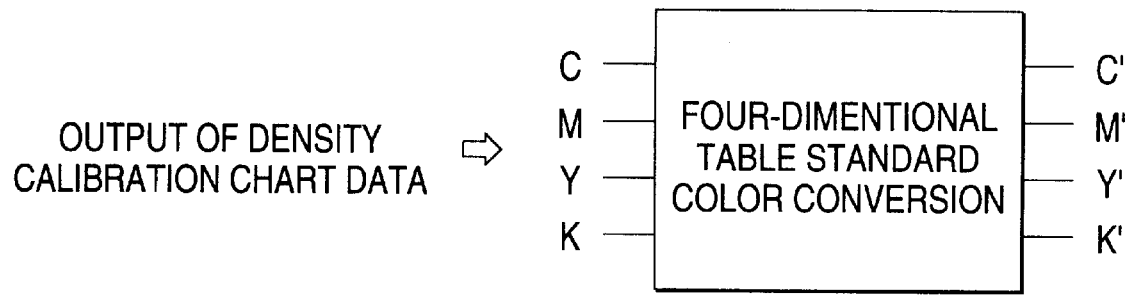
FIG. 4 is a diagram showing the relationship among C', M', Y'and K' after C, M, Y and K have been converted.
Figure 5:
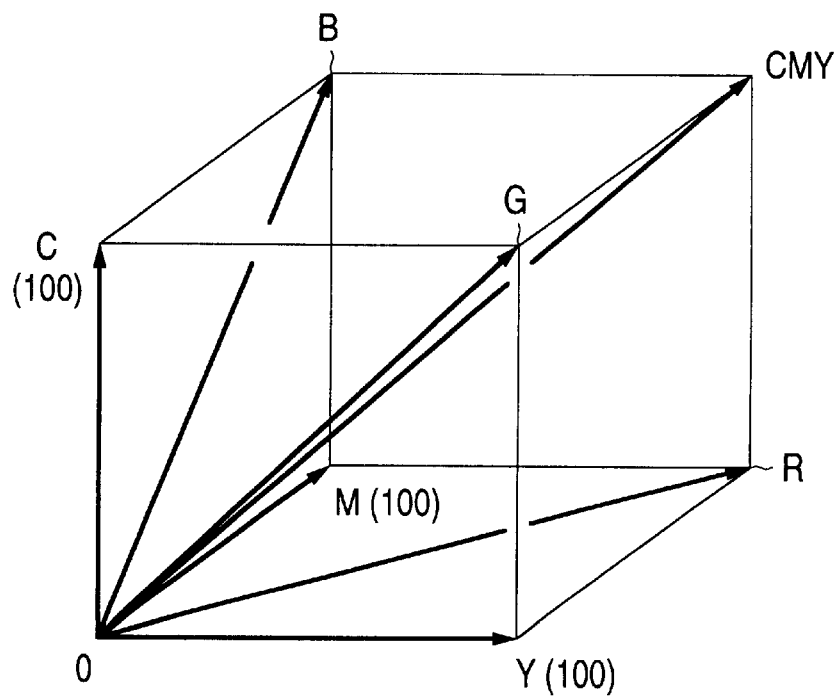
FIG. 5 is a diagram showing a three-dimensional lookup table.

A density gradient correction method for a printer incorporating a thermal head for forming a color image and a color printer adapted to the method according to the present invention will now be described with-reference to the drawings. Firstly, the structure according to a first embodiment for which color conversion is performed such that when at least one color of C, M, Y and K is 0%, the at least one color is 0% will now be described. In an example case where color is composed of Y, M and C, a three-dimensional lookup table as shown in FIG. 5 may be employed. A cubic model may be employed which has a structure as shown in FIG. 5 that the origin is 0%, the X axis stands for 100% Y, the Y axis stands for 100% M and Z axis stands for 100% C. Red (R) is located on a diagonal of Y and M, green (G) is located on a diagonal of C and Y, and blue (B) is located on a diagonal of M and C. When red (R) approaches M on a plane Y-M, red (R) is made to be reddish purple. When red (R) approaches Y, red (R) is made to be orange. The three-dimensional lookup table includes matrices with which supplied original data as Y, M or C is changed to Y', M' and C'. When K (black) is added, a four-dimensional lookup table shown in FIG. 4 is formed. The matrices in the lookup table have been determined for all colors for both printed matter and the color printer as a result of actual measurement.

Therefore, when the three or higher dimensional lookup table obtained by actual measurement is used, mixture of a color except for a pure color sometimes causes the chromaticity near the pure color to be obtained in a case where a required pure color is printed by a color printer.

If a color includes C by 0% and a color including C by 1% is closer to a required color as compared with a color including C by 0% when the color including C by 0% is printed by a color printer, a color proof is undesirably produced in which C is included by 1%. In this case, a user having a magnifier easily detects mixture of C in a color proof in which C is not mixed (if C is included by 17% in a portion in which C must be included by 16%, the user does not hardly detect this). Thus, the user misunderstands that data is incorrect. Therefore, if a color proof in which at least one color of C, Y, M and K is 0% is printed (even in a case where more satisfactory matching of the hue can be realized when the color included by 0% is mixed), the at least one color is made to be 0% in the present invention. In the example of the cube, the fact that at least one color of C, M and Y is included by 0% is, for example, the three ridge lines of C, M and Y, the three diagonals B, R, G of the cube, a color (for example, orange) on the plane Y-M, a color (for example, blue purple) on the plane M-C and a color (for example, yellow green) on the plane C-Y. If at least one of C, M and Y is included by 0%, the above-mentioned arrangement is employed.

Specifically, the translation table for use to perform the density calibration is arranged in such a manner that when at least one of C, M and Y or C, M, Y and K obtained by adding K is 0%, energy for the 0% gradient of the color is fixed. When the above-mentioned translation table is used to produce a color proof, a user does not make a misunderstanding. If the hue of the pigment is made to be significantly close to the ink for printing, a problem that the hue is changed considerably can be prevented.

The density gradient correction according to a second embodiment will now be described.

Figure 7:
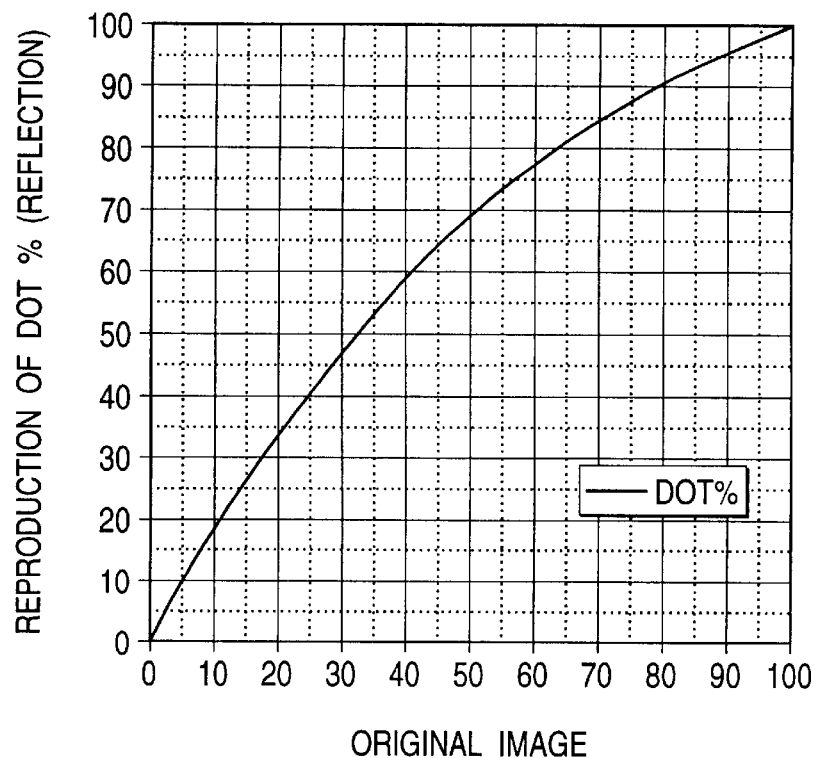
FIGS. 7(A) and 7(B) are graphs showing the relationship between an original image and reproduced dot percent, in which FIG. 7 (A) is an object drawing and (B) shows the relationship between designed gradient and reproduction dot percent.
Figure 7:
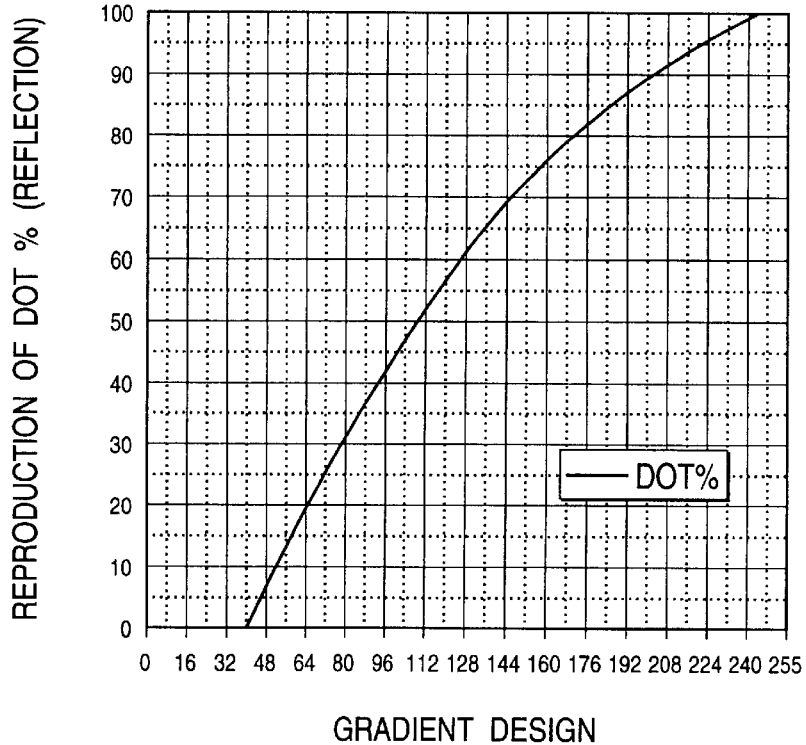

A graph shown in FIG. 7(A) shows a curve indicating an object of reproduction of single-color gradient. The axis of abscissa stand for dot percents of an original image, while the axis of ordinate stands for dot percents obtained by performing measurement by using a reflection-type density measurement apparatus. The reflection density is reproduction of dot percent (dot %) by a Murray-Davis's equation. That is, since the reflection density is determined by using a densitometer in place of a special measurement, such as an image analysis, an assumption is made that the amount of an optical dot gain of the color proof is similar to that of color art CR-T manufactured by Fuji Film or the like. In accordance with the reflection density of the color art, the dot percent obtained in accordance with the Murray-Davis's equation is employed as an object of the reproduction. It is ideal (an object) that reproduced area of halftone dot area of the color proof after transference of an output image from a color printer to paper coincides with original image (supplied digital data).

To achieve the above-mentioned object of reproduction in any case, the present invention has a structure that installation to a color printer for making a color proof is performed in such a manner that compression and movement of ends of the gradient shown in a graph shown in FIG. 7(B);and according to the present invention are performed. The obtained results are formed into a reproduction curve of a single-color. That is, the graph shown in FIG. 7(B) has a structure in such a manner that the axis of abscissa stands for the designed gradient which is equally divided into 256 sections from 0 in a direction from right to left. The right-hand end indicates the largest gradient value (recording energy) for a color printer engine, while the left-hand end indicates a gradient value of zero for the color printer engine. The above-mentioned graph is characterized in that the figure 244 of the axis of abscissa stands for solid black having a dot reproduction value of 100. Moreover, the figure 39 of the axis of abscissa stands for highlight having a dot reproduction value of 0. That is, the highlight having the dot percent reproduction value of 0 starts at about 39 in place of starting at 0. Moreover, the solid black having the dot percent reproduction value of 100 is realized when the figure is about 244 on the axis of abscissa. The regions on the axis of abscissa from 0 to 39 and from 244 to 255 are called margins in this embodiment.

Figure 8:
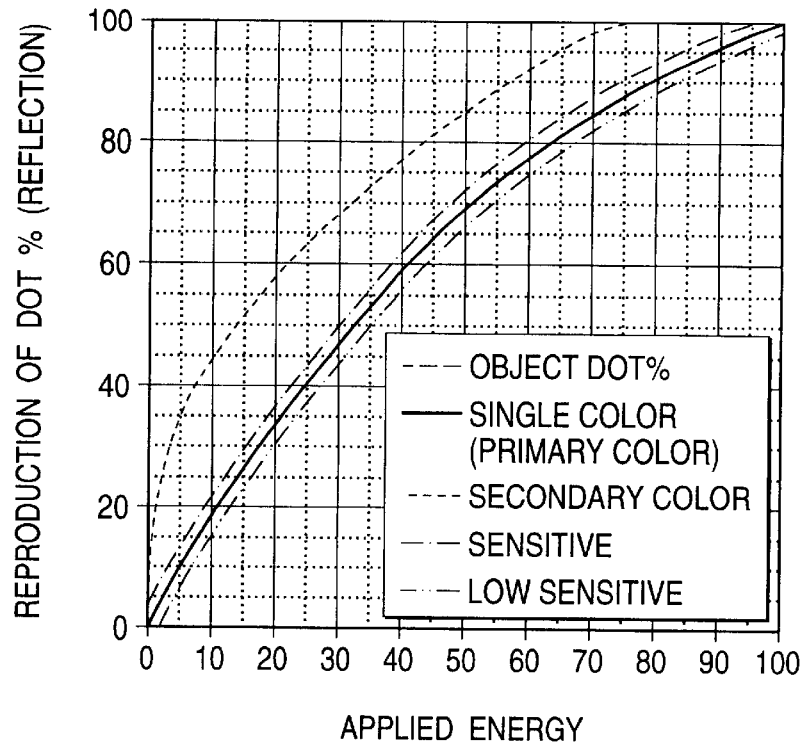
FIGS. 8(A) and 8(B) are graphs showing the relationship between applied energy and reproduced dot percent.
Figure 8:
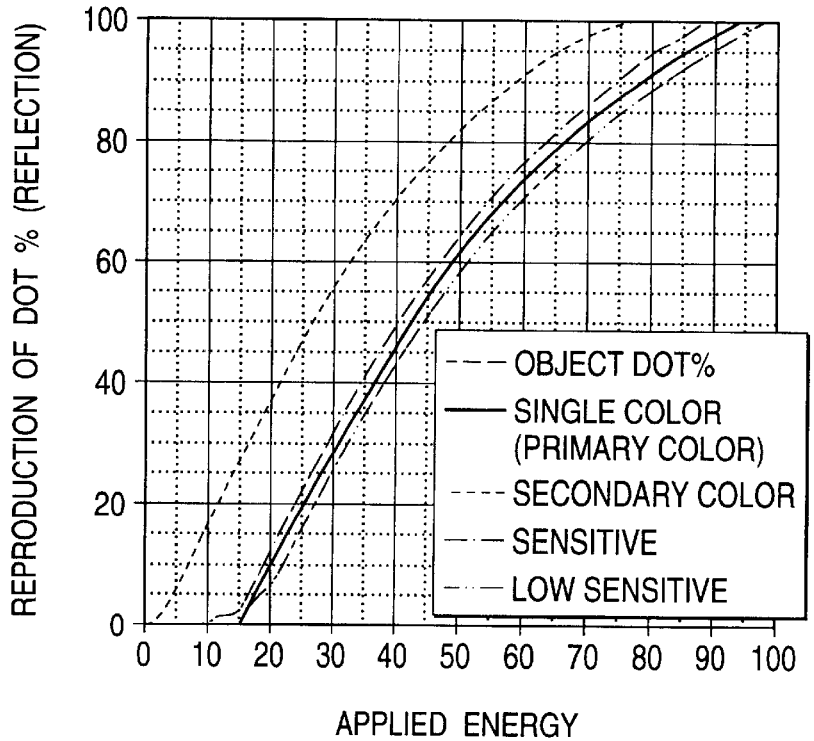

The necessity of the margin will now be described with reference to a graph shown in FIG. 8(A) with which a conventional density calibration method is shown and a graph shown in FIG. 8(B) showing the present invention.

FIG. 8(A) shows an ideal (object) curve shown in FIG. 7(A) with a solid line. FIG. 8(B) shows an ideal (object) dot percent curve shown in FIG. 7(B) with a solid line. A high-sensitivity graph (alternate long and short dash line) obtained when sensitive material and machine are used is drawn on the left of each of the above-mentioned two graphs. Moreover, a low-sensitivity graph (alternate long and two short dashes line) obtained when low-sensitive material and machine are used is drawn on the right of each of the above-mentioned two graphs. The dot percent is also called a halftone dot % which is an area ratio of printed ink.

As shown in FIG. 8(A), the ideal solid-line curve has a form that the dot reproduction % is zero when the applied energy is 0%. When applied energy is 100%, also the dot reproduction % is 100. However, the graph shown in FIG. 8(A) sometimes encounters undesirable change in the dot percent even if the same energy is supplied in a case where the materials and machine have differences. If the right- and left-hand margins are too small when shadow or highlight is formed, there arises the following problem: if the sensitivity of the material and the machine are too low, the alternate long and two short dashes line on the right of the ideal solid-line curve is employed. In this case, the dot reproduction % is not 100 when the applied energy is 100%. The dot reproduction % is terminated at about 97%. That is, there sometimes occurs a case in which the dot percent of 100% which is the full gradient in the shadow portion cannot be realized. If a sensitive material or a sensitive machine is employed, the alternate long and dash line on the left of the ideal solid-line curve is employed. Thus, the dot percent cannot be made to be 0 when the applied energy is 0%. The dot percent is terminated at about 3%. That is, there sometimes occurs a case in which highlight of 0% cannot be realized.

Moreover, there is a tendency that a high sensitivity of the material is realized in the secondary or higher color as compared with a single color (a primary color) (that is, higher dot percent is realized in the secondary color as compared with the primary color even if the same energy is applied). A graph indicating the above-mentioned tendency is shown in FIG. 8(A) with a dashed line. Also in this case, there is the same tendency as that realized when the sensitive material and the machine. Thus, the conventional method cannot express highlight.

The correction method according to the present invention having the margins as shown in FIG. 8(B) is able to reproduce dot percent of 0% to 100% even in the case where (1) the low sensitive material and machine are used, (2) the sensitive material and machine are used and (3) a secondary color is printed.

Density calibration tables according to the correction method according to the present invention are shown in FIGS. 9 to 17. The tables have designed 256 gradients such that the gradient values of the engine are 0 to 255 and the dot percents from 0% to 100%. FIG. 9 shows a table in which the gradient value in the engine is 0 and the dot percent is 0%. As the figure number increases (from FIG. 10 to FIG. 16), the gradient value in the engine is raised. When the gradient value in the engine is 255 (see FIG. 17), the dot percent is 100%. In the present invention, the original image has a structure that data of the original image value of 0 is included in a gradient value of 4 (see FIG. 9) in the engine. The upper and lower portions of the foregoing value are blank portions. If the lower portion is located apart from the foregoing value, a dot is sometimes undesirably added when highlight is expressed when the sensitive material and machine are employed or a secondary color is formed. As for the shadow, data for Y, M and C to the original image of 99.6 (see FIG. 17) skip six gradient values in the engine when data is 100. Thus, only when data 100 is supplied with which clear solid is attempted to be expressed, energy can rapidly be enlarged as compared with other data items. Moreover, K is located lower than Y, M and C. Data when K is 100 is skipped by 12 gradient values in the engine. Thus, K is supplied with larger energy as compared with Y, M and C.

Figure 1:
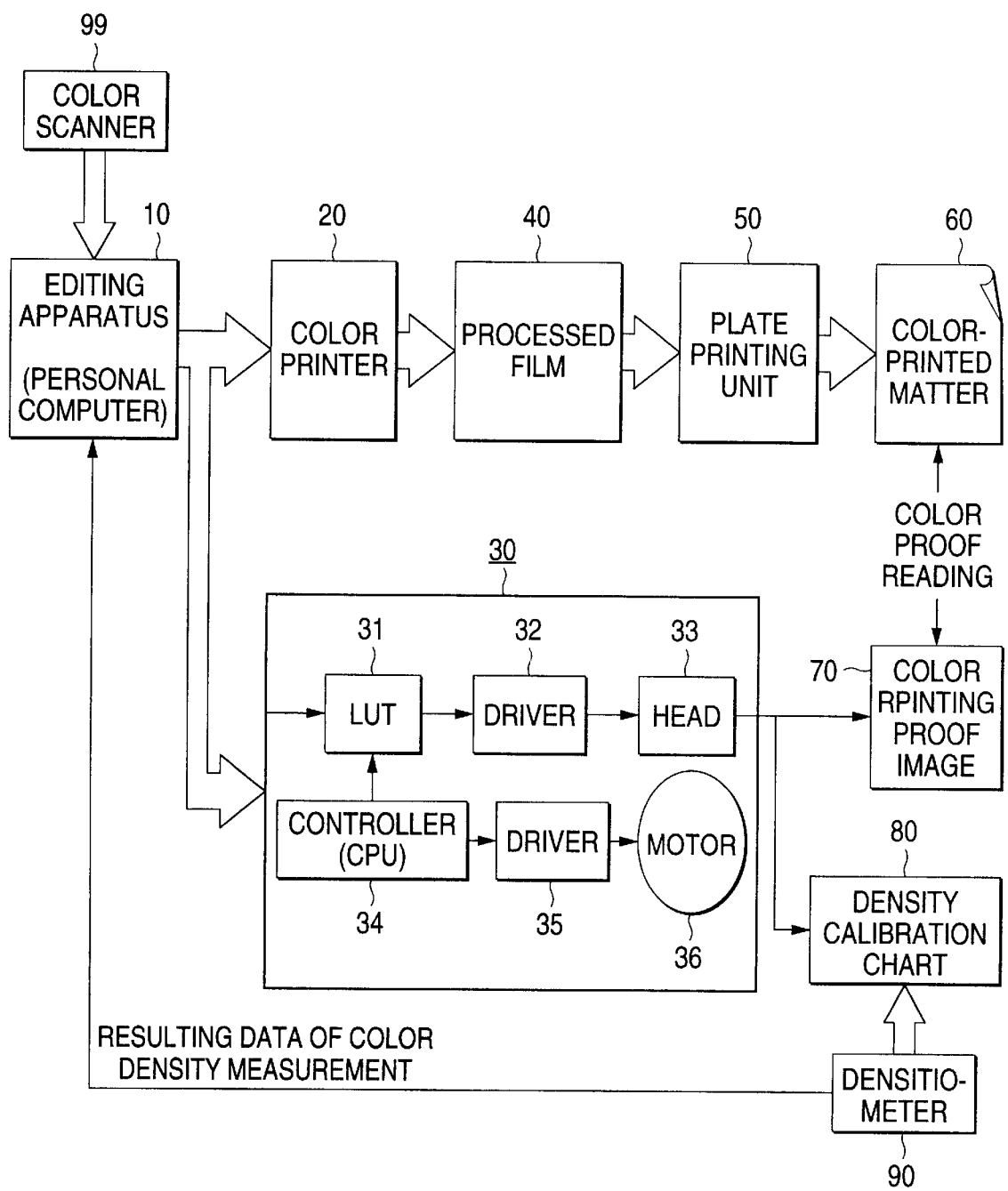
FIG. 1 is a diagram showing a density calibration method.

When density calibration which is a first step for adjusting the color density is performed, the color printer corrects machine difference in the color printer or dispersion of the color density occurring as time elapses or confirms the correction by producing an output of a density calibration chart. FIG. 1 shows the color matching method and the method of performing the density calibration.

Referring to FIG. 1, data edited by an editing unit 10 is supplied to a color printer 20 so that a processed film 40 is produced. Then, the processed film 40 is printed by a plate printing unit 50 so that color printed matter 60 is obtained. On the other hand, data edited by the editing unit 10 is supplied to a color printer 30 so that a proof image 70 is obtained by color printing. A user subjects the obtained color printed matter 60 and the proof image 70 to a comparison. Then, color proofreading is performed in such a manner that the proof image 70 coincides with the color printed matter 60. Thus, the color matching operation is performed.

On the other hand, the density calibration is performed as follows: the density of a density calibration chart (see FIG. 6 and to be described later) output from the color printer 30 is measured by a densitometer 90. A result of the measurement of the color density is supplied to the editing unit 10 comprising a personal computer. Image data supplied to the editing unit 10 is converted in accordance with the result of the measurement. If image data required to be printed is supplied from, for example, a color scanner 99 to the editing unit 10, the editing unit 10 converts image data in accordance with the result of the measurement, and then corrected data is supplied to the color printer 30.

The color printer 30 shown in FIG. 1 comprises a lookup table calculating portion (hereinafter called a "LUT") 31, a head driver 32, a head 33, a controller (CPU) 34, a motor driver 35 and a motor 36. The LUT 31 creates strobe pulse widths (μs) corresponding to 0 to 255 gradients. The head driver 32 drives the head 33 so that the head 33 is supplied with corresponding energy. The inside portion of the editing unit 10 has a structure arranged as shown in FIG. 2.

Figure 2:
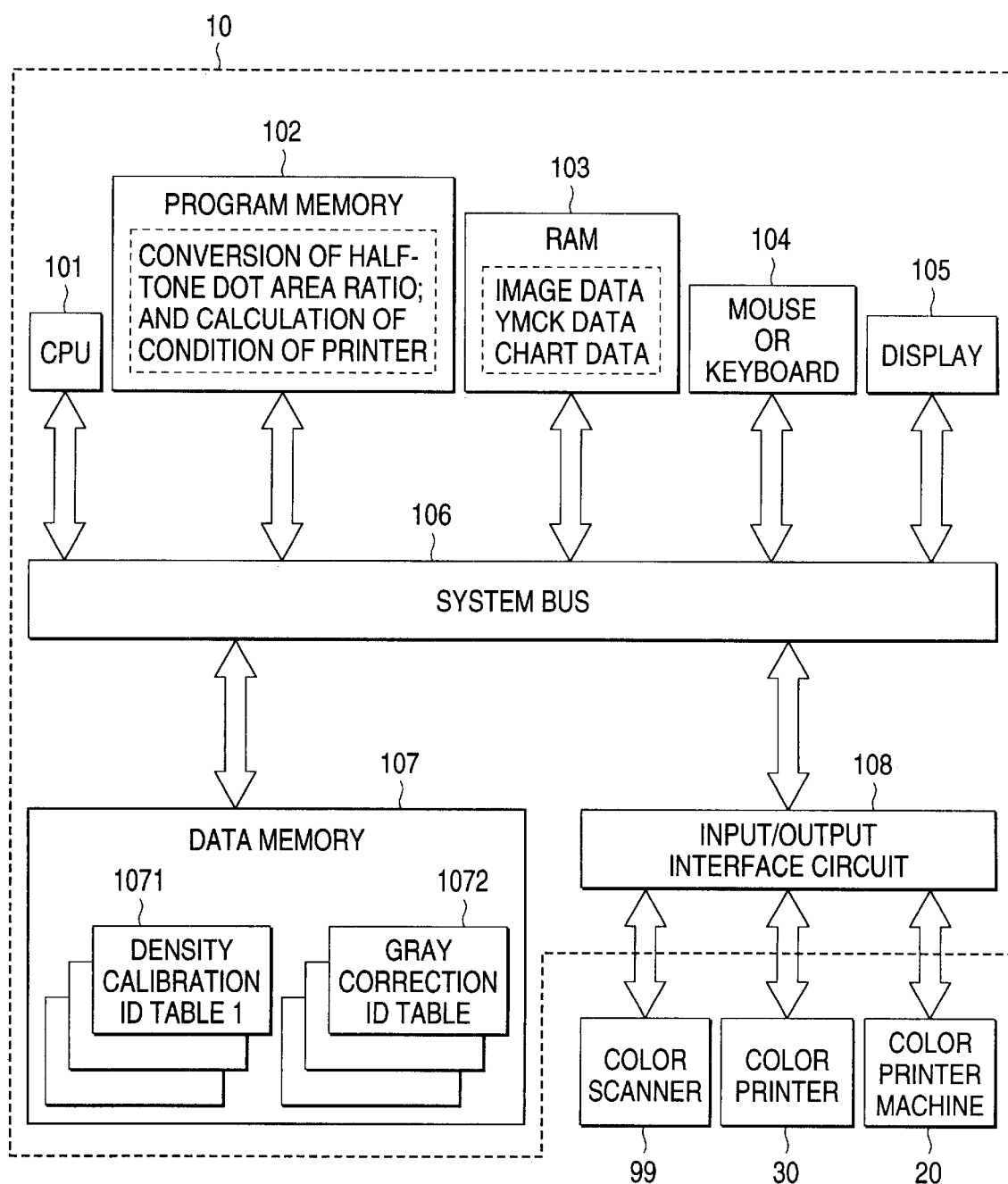
FIG. 2 is a diagram showing an editing unit 10.

Referring to FIG. 2, the editing unit 10 has a system bus 106 to which a CPU 101, a program memory 102, a RAM 103, a keyboard or a mouse 104, a display 105, a data memory 107 and an input/output interface circuit 108 are connected. The color scanner 99, the color printer 30 and the color printer 20 are connected to the input/output interface circuit 108. Programs for converting the halftone dot area and correcting the conditions of the printer and the like are stored in the program memory 102. Image data, C, M, Y and K data, chart data and the like are stored in the RAM 103. A density calibration ID (dimensional) table 1071 and a gray correction 1D (dimensional) table 1072 are stored in the data memory 107. The density calibration 1D (dimension) table 1071 includes inverse functions corresponding to the density calibration chart 80 shown in FIG. 1. In operation, data supplied from the color scanner 99 is allowed to pass through the input/output interface circuit 108 and the system bus 106, and then supplied to portion of the RAM 103 for storing C, M, Y and K data so as to be corrected with the foregoing data items. Then, corrected data is supplied to the color printer 30. The structure of software in the color printer 30 is arranged as shown in FIG. 3.

Figure 3:
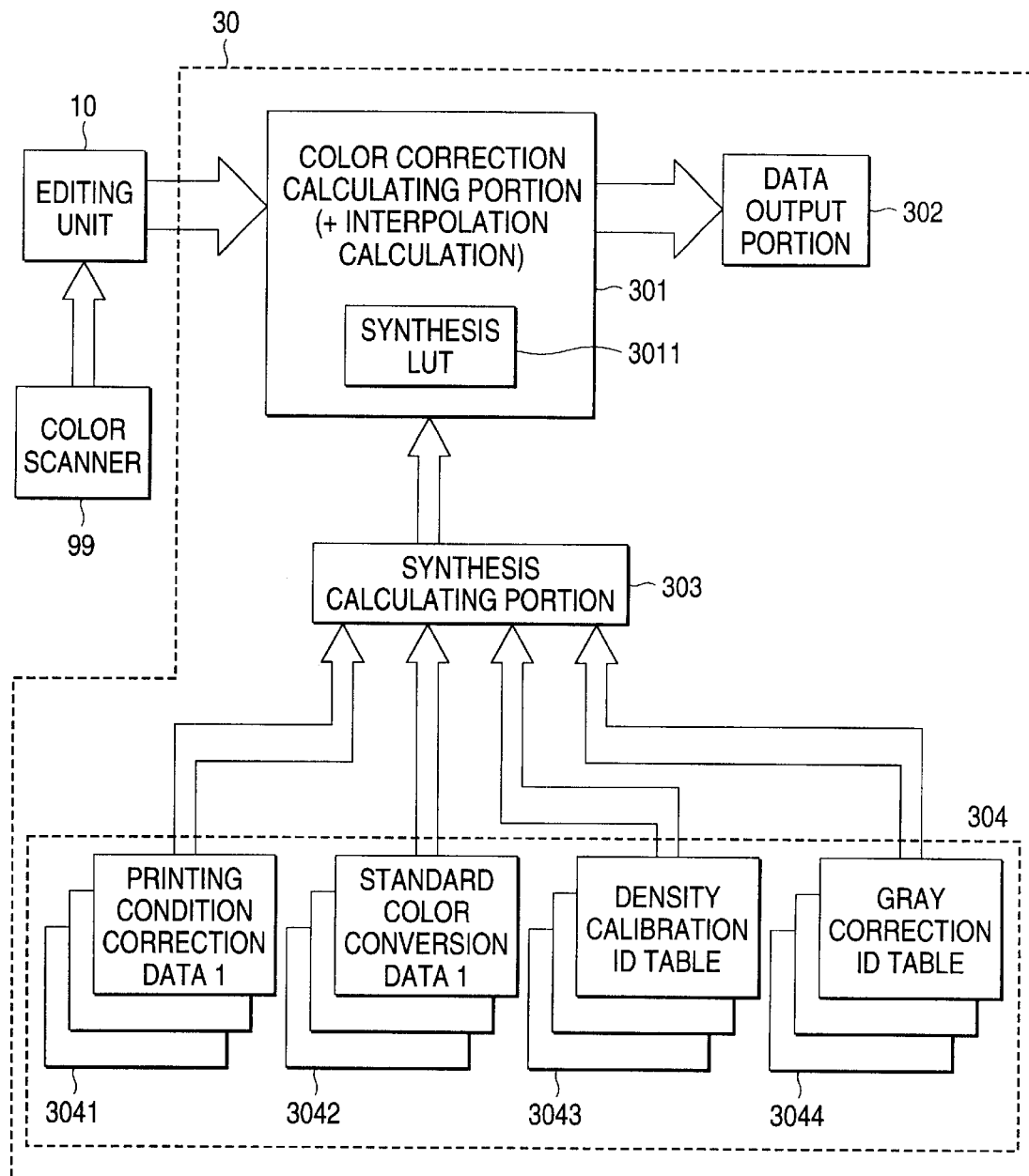
FIG. 3 is a diagram showing the structure of software in a color printer 30.

Referring to FIG. 3, the color printer 30 comprises a color correction calculating portion 301, a data output portion 302, a synthesis calculating portion 303 and the memory 304. In the memory 34, tables for printing-condition correction data 3041, standard color conversion data 3042, a density calibration one-dimensional table 3043 and a gray correction one-dimensional table 3044 are prepared. Data in the density calibration one-dimensional table 3043 is supplied to the synthesis calculating portion 303. Also printing-condition correction data 3041, standard color conversion data 3042 and data in gray correction one-dimensional table 3044 which must be corrected are supplied to the synthesis calculating portion 303. All of the synthesized and calculated values are supplied to the color correction calculating portion 301 so that a synthesized lookup table 3011 is created. Moreover, C, M, Y and K data previously supplied from the editing unit 10 is subjected to conversion only one time by using the synthesized lookup table 3011 so that a color correction calculation is performed. A result of this is supplied to the data output portion 302.

A density calibration chart for performing the density calibration is shown in FIG. 6. As shown in FIG. 6, the density calibration is composed of a plurality of rectangles (hereinafter called "color patches") printed output for each of C, M and Y in a stepped manner from the dot percent density of 0% to 100%. To clearly indicate the density range, the density calibration chart has a structure that a color patch of the highest density (100%) is located at the leading end thereof. Moreover, a color patch of the lowest density (0%) is located to a next position. In addition, the intermediate gradients are arranged in the descending order. In a first step of the color density adjustment, an operator uses the color printer 30 to print a density calibration chart for each of Y, M, C and K at the instructed dot percent. The density of each color patch is measured by the densitometer 90. If the measured value coincides with an object halftone dot %, no process is performed. If they do not coincide with each other, a density calibration table 1071 is produced to make the density coincide with the standard so as to correct original data. The density calibration is performed as described above. That is, if the color is too thin as a result of the measurement performed by using the densitometer 90, the density calibration 1D (dimension) table 1071 is produced in such a manner that original data is somewhat thickened.

Referring to tables shown in FIGS. 9 to 17, the density must be somewhat raised as a result of the measurement, the overall figures in the table must be moved downwards by about two columns. If the density is required to be lowered, the overall figures in the table must be moved upwards by about two columns.

FIG. 6 shows a density calibration chart according to the present invention in which the calibrations in the vicinity of the highlight and that of the shadow are fine. The highest density dot percent of 100% is a gradient value of a 255-th print engine. Moreover, the lowest density dot percent 0% is a gradient value of a fourth print engine. The intermediate portion is arranged in such a manner that the illustrated intervals are employed for the highlight. The gradient values (applied energy) in the print engine are arranged in such a manner that the intervals of the gradient values in the print engine are narrowed in the vicinities of the shadow and the highlight (for example, dot percents 95% to 75% adjacent to the shadow are reduced by the gradient values of 4 to 6 in the print engine and dot percents 30% to 5% adjacent to the highlight are reduced by the gradient values of 3 to 5 in the print engine). In the halftone range, the intervals of the gradient values are widened (for example, dot:percents 75% to 40% are reduced by a gradient value of 20 in the print engine). The present invention employs the patch for the density calibration having the structure that the calibrations in the vicinities of the highlight and the shadow are fine when a color printing operation is performed. Therefore, (1) addition of a dot to highlight, (2) deformation of a solid portion which are easily detected by a user in a case of a halftone dot gradient can be prevented. Even if the intermediate gradient is somewhat shifted, a greater permissible range is given as compared with the highlight and shadow. Therefore, any program takes place in a practical operation. Patches for the density calibration having the structure that the calibrations in the vicinities of the highlight and the shadow shown in FIG. 6 are indicated with black dots in the tables shown in FIGS. 9 to 17.

The density calibration according to the present invention are summarized as follows:

1. Compression of Gradient:
(1) Provision of Margin for Highlight Portion for Correcting Characteristic of Higher-Order Colors (Sensitization of Secondary, Tertiary and Quaternary Colors)

In a heat sensitive recording system, an insensitive region in which a satisfactory density (dots cannot be formed) cannot be obtained even if energy is supplied exists.

In a color printer adapted to a thin-film transfer method, the foregoing region is large (energy with which dots are formed is high) in a case of a single color (which is recorded on a receiver sheet). In a case of a secondary or higher color (which is recorded on the previously recorded dot or recorded adjacent to the previously recorded dot), the foregoing is small as compared with the single color (energy with which dots are formed is low) (see FIG. 8(B)).

Therefore, if reproduction of applied energy-dot percent of a color printer is designed by using the characteristic of a single color, dots are rapidly formed in the highlight portion in a case of the secondary or higher color. Thus, color jump takes place and thus disorder takes place (see FIG. 8(A)).

When the margin in the vicinity of the highlight is previously enlarged as shown in FIG. 7(B) when the gradient is designed, the disorder of the secondary or higher colors can be prevented, as shown in FIG. 8(B).

Separation between the primary color and the secondary or higher colors is compensated by performing conversion by using a color table.

(2) Provision of Density Calibration Margin:

In a color printer, the sensitivity of a single color is sometimes undesirably changed because of the difference in the machine, the sensitive material and the lot difference.

If the reproduction of the applied energy-dot % of the printer is designed by using a mean combination, 100% (solid) is deformed and eliminated if the low sensitivity factors are combined with each other (see FIG. 8(A)).

When the margin in the vicinity of the shadow is, in the gradient design, provided as shown in FIG. 7(B), reproduction of a solid can be realized even if the sensitivity is low as shown in FIG. 8(B) (since the margin in the vicinity of the highlight is enlarged in (1) in the case of the high sensitivity, the reproduction can be realized).

The foregoing problem is corrected by printing a wedge in single color, by measuring the density and by calculating a correction curve (density calibration).

2. Movement of End Point ("Heat" and Movement of Solid Point);

(1) 1-Heat

To prevent addition of a dot to highlight (in an initial stage) and deformation of a solid portion having a small area, the output-side gradient point is assigned to original data of 0%. In this case, the phenomena 1-(1) and 1-(2) are considered, dot addition is prevented even if sensitive factors are combined and even if a higher-order color is printed.

Design is performed in such a manner that energy is applied, the magnitude of which does not cause a tail (addition of a small dot) even after the solid image has been printed.

If small energy is supplied to the head to previously heat the head in a case where a non-image portion is printed, the addition of a dot to the highlight (in the initial stage) and deformation of a solid portion having a small area can be prevented.

(2) Movement of Solid Point (Improvement in Deformation of Solid and Generation of White Missing Portion):

In the central portion of the patch for measuring the density (about 1 cm x 1 cm), the solid portion of a solid point (having a gradient value of 244 in the print engine shown in FIG. 17) moved by the gradient compression is deformed because of 1-(2). Although the highest density can be realized in design, unsatisfactory deformation of dots takes place in the vicinity of the patch. Thus, the density is lowered. A smaller solid images suffers from the above-mentioned problem. However, the density calibration by using the densitometer for measuring the central portion of the patch cannot overcome the above-mentioned problem.

Therefore, only the point of input 100% for C, M, Y and K is shifted toward the large energy portion by six gradients (/255) from the solid point (having a gradient value of 244 in the print engine shown in FIG. 17) moved by the gradient compression (variable (always shifted by six gradients from the solid point corrected by the density calibration)).

Moreover, the point of input 100% is moved to the point of the maximum energy (having a gradient value of 255 in the print engine shown in FIG. 17) (fixed) to improve the reproduction (prevent deformation) of hair lines and characters.

The reason why the maximum energy point is not employed and the variable method is employed for C, M, Y and K will now be described. If excessively large energy is supplied, the color printer sometimes encounters overheat which is a phenomenon in which a white missing portion is formed in the central portion of the dot. Therefore, both of the overheat and the deformation of the solid portion must be prevented.

Since excessive missing does not take place in K, reproduction (prevention of deformation) of hair lines and characters is given priority. Thus, the shift to the maximum energy is employed.

The foregoing method was adapted to a color printer according to the following embodiment so as to confirm the effect of the present invention.

a. EXAMPLE

Condition

Printer: Digital Color Proof FIRST PROOF Printer manufactured by Fuji Film

Laminator: Digital Color Proof FIRST PROOF Laminator manufactured by Fuji Film

Receiving Sheet: Receiver Sheet A3W for Digital Color Proof FIRST PROOF manufactured by Fuji Photo Film Co., Ltd.

Thermal Transfer Ribbon: Proof Ribbon Adjacent for Digital Color Proof FIRST PROOF manufactured by Fuji Photo Film Co., Ltd.

Main Paper: Tokubishi Art Paper

The receiving sheet and the thermal transfer ribbon were those for the thin-layer thermal transfer process. The material adapted to the foregoing method incorporates a coloring material layer having a thickness of 1 $\mu$m or smaller, preferably about 0.3 $\mu$m or smaller. Since the thickness is very small, a higher resolution can be obtained as compared with the other thermal transfer method. Therefore, fine dots can stably be formed.

Other purposes, as well as the thermal transfer method, the method according to the present invention is effective for electronic photographic, ink jet, color heat sensitive, Toner Jet and ion flow printers.

As described above, according to the present invention, mixture of another color with the primary color can be prevented. Therefore, an unsatisfactory portion cannot be detected even if the dot is observed with a magnifier. The solid image can be formed without any gap. Characters in K can be clearly formed. The accuracy of the density calibration can be improved. Even if the sensitivity of the secondary color is raised as compared with the primary color, any problem that an undesirable dot is printed additionally can be prevented.

If the above-mentioned methods are employed simultaneously, all of the following checking items for color proof can be performed:

(1) checking whether or not data of another color is mixed with data to be printed;

(2) checking whether or not a complete solid portion in the data to be printed has been formed;

(3) checking of the thickness of characters; and (4) checking of continuity of gradient of highlight and shadow, in particular, gradation.

What is claimed is:

1. A color converting method comprising the step of:
   performing three or more dimensional color conversion such that when at least one color of coloring materials has a halftone dot percentage of 0% in a state before the conversion, the at least one color keeps a halftone dot percentage of 0% after conversion,
   wherein first $X_1$, second $X_2$ and third $X_3$ coordinates correspond to axes of a Cartesian coordinate system, and wherein a fourth coordinate $X_4$ corresponds to a K value and wherein fifth $X_5$ and sixth $X_6$ coordinates correspond to reference axes lying in a plane of the Cartesian coordinate system, said conversion applied to at least three of said first through sixth coordinates.

2. The method of claim 1, wherein the conversion is applied to at least four of said first through sixth coordinates.

3. The method of claim 1, wherein the fourth and fifth coordinates correspond to respective planes where one of said first, second and third coordinates equals zero.

4. A color printer comprising:
   a translation table with which color conversion is performed such that when at least one color of coloring materials has a halftone dot percentage of 0%, the energy for 0% gradient of the at least one color is fixed,
   wherein first $X_1$, second $X_2$ and third $X_3$ coordinates correspond to axes of a Cartesian coordinate system, and wherein a fourth coordinate $X_4$ corresponds to a K value and wherein fifth $X_5$ and sixth $X_6$ coordinates correspond to reference axes lying in a plane of the Cartesian coordinate system, said color conversion applied to at least three of said first through sixth coordinates.

5. The color printer according to claim 4, further comprising a thermal head for printing images based on energy levels supplied by said translation table.

6. The method of claim 4, wherein the conversion is applied to at least four of said first through sixth coordinates.

7. The method of claim 4, wherein the fourth and fifth coordinates correspond to respective planes where one of said first, second and third coordinates equals zero.

8. A printer comprising:
   a halftone-dot area converting means for converting a first image information into a second image information having a set of halftone-dot areas which provide a gradation information of said first image information;
   a gradation correction table for correcting said gradation information in which a difference in energy corresponding to a solid gradient of a shadow portion is larger than that corresponding to other gradients.

9. The printer according to claim 8, wherein said gradation correction table is defined in such a way that the difference in energy of a black color is larger than the differences of other colors.

10. A density gradient correction method comprising the step of:
    performing density calibration by using a density calibration patch having a structure such that calibrations in a vicinity of a highlight portion and in a vicinity of a shadow portion are finely spaced in comparison with a non-highlight portion and a non-shadow portion.

11. A color printer comprising:
    a density-calibration patch having a structure such that calibrations in a vicinity of a highlight portion and in a vicinity of a shadow portion are finely spaced in comparison with a non-highlight portion and a non-shadow portion.

12. A printer according to claim 11, further comprising:
    a translation table with which color conversion is performed such that when at least one of color of coloring materials has a halftone dot percentage of 0%, the energy for a 0% gradient of the at least one color is fixed.

13. The color printer according to claim 11, further comprising a thermal head for printing images based on energy levels corresponding to density levels read from said density-calibration patch.

14. A density gradient correction method comprising the step of:
    providing a margin width for a highlight portion and a margin width for a shadow portion, wherein the margin width for the highlight portion includes a first number of gradient values between a minimum gradient value and a gradient value corresponding to production of a 0% density, and wherein the margin width for the shadow portion includes a second number of gradient values between a maximum gradient value and a gradient value corresponding to production of a 100% density.

15. The density gradient correction method according to claim 14, wherein the margin width for the highlight portion is wider than that for the shadow portion.

16. A method according to any of claims 10 and 14–15 further comprising:
    performing three or more dimension color conversion such that when at least one color of coloring materials has a halftone dot percentage of 0% in a state before the conversion, the at least one color keeps 0% after conversion.

17. A density gradient correction method comprising the step of:
    supplying weak energy to a head corresponding to a non-image portion in a case of a primary color such that the intensity of a weak energy also does not cause a dot to be printed in the non-image portion in a case of a secondary or color.

18. A method according to any of claims 1, 10, 14, 15, and 17, further comprising forming an image using a thin-film thermal transfer method.

19. A method according to claim 17 further comprising:
    performing three or more dimensional color conversion such that when at least one color of coloring materials has a halftone dot percentage of 0% in a state before the conversion, the at least one color keeps a halftone dot percentage of 0% after conversion.

20. A color printer comprising:
    a density gradient translation table for supplying weak energy to a head corresponding to a non-image portion in a case of a primary color such an intensity of the weak energy also does not cause a dot to be printed in the non-image portion in a case of a secondary color.

21. The printer according to any one of claims 4, 11 and 20 further including a thin-film thermal transfer imaging device.

22. A printer according to claim 20 further comprising a translation table with which color conversion is performed such that when at least one color of coloring materials has a halftone dot percentage of 0%, the energy for a 0% gradient of the at least one color is fixed.

23. A color converting method comprising:
    performing three or more dimensional color conversion such that when at least one color of coloring materials has a halftone dot percentage of 0% in a state before the conversion, the at least one color keeps a halftone dot percentage of 0% after conversion, wherein a multidimensional coordinate correspond to $X_1$, $X_2$, ..., and $X_n$ axes of a Cartesian coordinate system, said n being an integer no less than three.

24. A color printer comprising:

a translation table with which multidimensional color conversion is performed such that when at least one color of coloring materials has a halftone dot percentage of 0%, the energy for 0% gradient of the at least one color is fixed, wherein multidimensional coordinates correspond to $X_1$, $X_2$, ..., and $X_n$ axes of a Cartesian coordinate system, said n being an integer no less than three.

* * * * *